Oct. 8, 1968  F. MELLION  3,404,927
BATTERY DISPENSER
Filed April 17, 1967  2 Sheets-Sheet 1
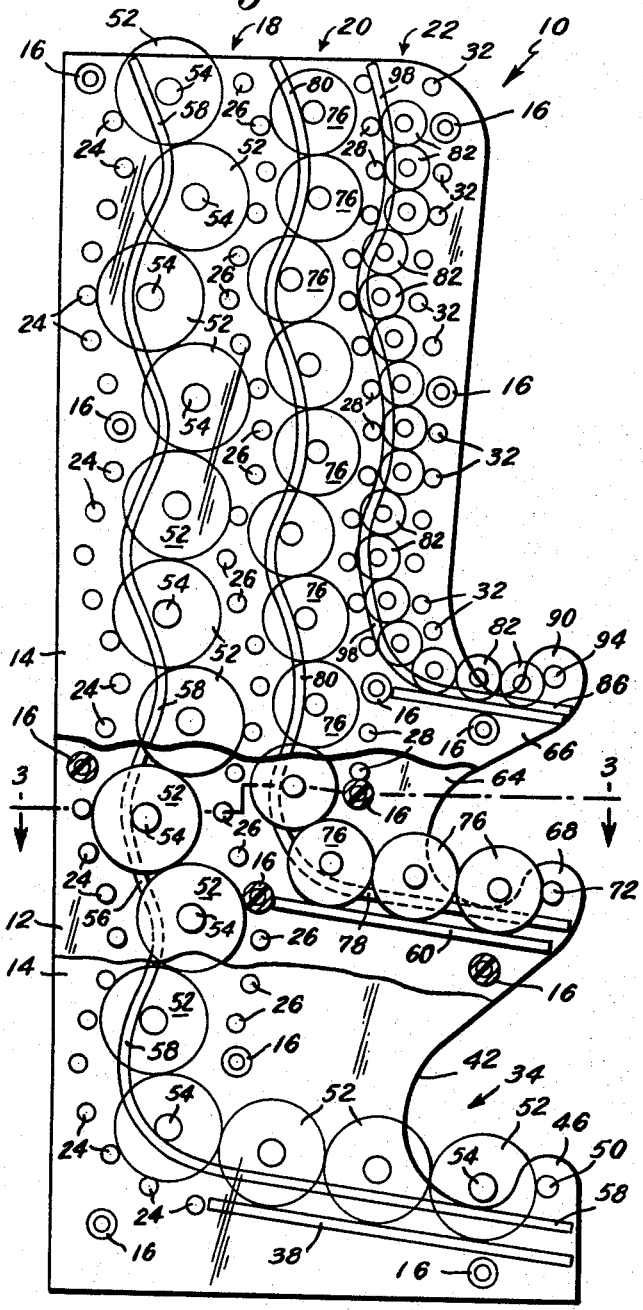
Inventor,
Frank Mellion,
by Salter & Michaelson
Att'ys.

Oct. 8, 1968  F. MELLION  3,404,927
BATTERY DISPENSER
Filed April 17, 1967  2 Sheets-Sheet 2

Inventor,
Frank Mellion,
by Salter & Michaelson
Att'ys.

United States Patent Office 3,404,927
Patented Oct. 8, 1968

3,404,927
BATTERY DISPENSER
Frank Mellion, Providence, R.I., assignor to Jo-Dee Corp., Warwick, R.I., a corporation of Rhode Island
Filed Apr. 17, 1967, Ser. No. 631,219
6 Claims. (Cl. 312—45)

ABSTRACT OF THE DISCLOSURE

A dispenser for use on a counter of a retail establishment in the dispensing of batteries having a magazine portion formed therein in which the batteries are received, the magazine portion being generally vertical for receiving the batteries in stacked relation and being defined by a plurality of aligned pins that provide for restricted movement of the batteries through the magazine portion to a dispensing station.

Background of the invention

The usual manner of displaying batteries in a retail establishment for the sale thereof is in permanent type racks that form a part of a wall or island display unit. Although this type of display rack for batteries has been found acceptable for use, there has been developed in recent years a counter type of display unit in which the articles are displayed in the vicinity of the cashier or other similar location so as to stimulate impulse buying. These prior known point of sale display racks have included some means for receiving cylindrical articles therein and directing them to a dispensing station for removal by the customer. Although these prior known counter display devices have been satisfactory in use, the present invention defines an improvement thereover and is particularly adaptable as a counter display in the dispensing of batteries.

Summary of the invention

The present invention relates to a battery dispenser that includes spaced side walls between which at least one magazine portion is defined. The magazine portion is adapted to receive the batteries at the upper end thereof, the axis of the batteries as deposited being disposed in horizontal relation. After the batteries are deposited in the magazine portion they descend therethrough to a dispensing station that is located generally at the front portion of the rack. In order to direct the batteries downwardly through the magazine portion, a plurality of pins are provided and are joined to the side walls of the rack. The pins are arranged in aligned sets, the pins on one side wall being generally aligned wtih pins joined to the other side wall. The first set of aligned pins cooperate with another set of aligned pins to define a pathway in the magazine portion through which the batteries descend. The pathway as defined by the sets of aligned pins is somewhat zig-zag in configuration, the circuitous pathway as thus defined being designed to brake the descend of the batteries as they move downwardly through the magazine portion. Since the rack of the present invention is designed to dispense batteries therefrom, spacing strips are secured to the side walls so as to reduce the effective width of the magazine portion, thereby compensating for the extension of the terminals joined to an end of the batteries. The cylindrical portions of the batteries are thus contained between the spacer strips and the terminals thereof extend beyond the adjacent spacer strip during the descent of the batteries through the magazine portion.

Accordingly, it is an object of the present invention to provide a rack for a storing and dispensing batteries therefrom.

Another object of the invention is to provide a rack for storing and dispensing batteries therefrom, a magazine portion being formed in the rack and defined by a plurality of laterally extending pins, the pins braking the action of the batteries as they descend in the magazine portion.

Still another object is to provide a dispensing device that is formed with a magazine portion that includes a passage or pathway for receiving batteries therein, the pathway having a circuituous configuration that is defined by laterally extending pins that are joined to the side walls of the dispensing device.

Other objects, features and advantages of the invention will become apparent as the description thereof proceeds when considered in connection with the accompanying illustrative drawings.

Description of the drawings

In the drawings which illustrate the best mode presently contemplated for carrying out the invention:

FIG. 1 is a side elevational view of the dispensing rack embodied in the present invention;

FIG. 2 is a front elevational view of the dispensing rack illustrated in FIG. 1.

Description of the invention

Figure 3:
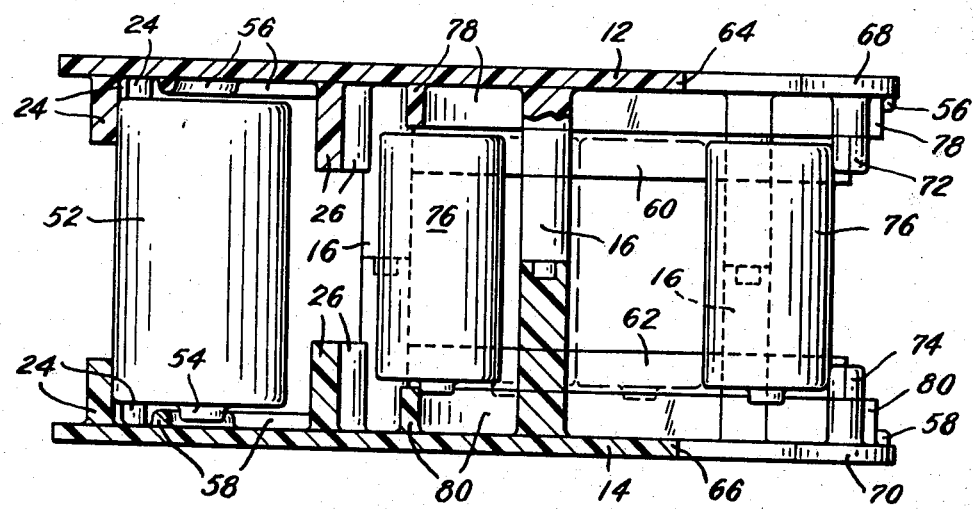
FIG. 3 is a sectional view taken along lines 3—3 in FIG. 1.

Referring now to the drawings and particularly to FIGS. 1 and 2, the dispensing rack embodied in the present invention is generally indicated at 10, and as shown the rack 10 is adapted to receive cylindrical articles such as batteries therein for the storing and dispensing thereof. However, it is understood that articles other than batteries may be received in the dispensing device 10 so long as the axes of the articles are disposed generally horizontal. As will be described hereinafter, the articles to be dispensed are deposited in the rack at a loading station and are moved to a dispensing station through a magazine portion, the magazine portion being located within the side walls of the dispensing rack 10. It is also understood that the dispensing rack 10 is of the portable type and is adapted to be placed in an accessible location on a counter in a retail establishment and as such defines a point of sales selling tool.

The dispensing rack 10 includes spaced side walls 12 and 14 that are preferably molded of a clear plastic material, the side walls 12 and 14 being shaped substantially identical and being disposed in their spaced apart position by spacer members 16. The spacer members 16 are actually formed in two parts, each part of a spacer member being integrally molded to a side wall 12 or 14 and being constructed so as to be interjoined with the other part of the spacer member. In this connection either of the portions of the spacer members 16 may be formed with a socket or projection, the projections being received in the sockets for joining of the spacer member portions to define the complete spacer members. Thus it is seen that the walls 12 and 14 with the spacer member parts integrally joined thereto are interconnected by means of the spacer member parts, the walls thereby being properly located in their spaced apart position, as clearly illustrated in FIG. 2.

Referring again to FIG. 1, the side walls 12 and 14 are shown substantially rectangular in configuration although the front edges thereof are formed with vertically spaced cut-out portions, as will be described, the cut-out portions being located at dispensing stations formed in the unit. The lowermost edges of the side walls 12 and 14 are flat and thus define feet for supporting the dispensing rack 10 in an upright position.

Although the concept of the present invention could be incorporated in a rack having a single magazine and dispensing station, it is preferred that a plurality of magazine portions be located therein. Thus as shown in FIGS. 1 and 3, the rack 10 includes magazine portions indicated generally at 18, 20 and 22, all of which are generally parallel in the arrangement thereof between the side walls 12 and 14 but which extend from the rear to the front of the rack, respectively. The magazine portion 18 is disposed more closely to the rearmost side of the display rack 10 between the walls 12 and 14 and is defined by a rear set of article directing elements or pins 24 and a forward set of article directing elements or pins 26. The article directing pins 24 and 26 are integrally molded to the side walls 12 and 14, and as shown in FIGS. 2 and 3, the set of pins 24 are arranged in spaced pairs that are located adjacent to the rearmost edges of the walls 12 and 14 and that are disposed in generally aligned relation with respect to the horizontal. Similarly the set of pins 26 that define the forward edge of the magazine portion 18 includes spaced pairs that are generally aligned and that are disposed in horizontal relation. As again shown in FIG. 1, the individual pins 24 and 26 are joined to each of the walls 12 and 14 such that the pins on each wall are disposed in staggered vertical relation, thereby forming the magazine portion 18 in a generally zig-zag configuration, wherein the pathway through the magazine portion 18 is essentially circuitous. As will be described, the zig-zag magazine portion provides for receiving additional articles as compared to a vertical magazine and further locates the articles in engaging relation with the article directing pins, which in effect brakes the descent of the articles as they move downwardly through the magazine.

The magazine portion 20 which is also formed in the display rack 10 between the side walls 12 and 14 is defined by the set of article directing pins 26 and a similar set of pins 28, the pins 28 being molded to the side walls 12 and 14 and cooperating with the pins 26 to form the intermediate magazine portion 20. The pins 28 also cooperate with another set of pins 32 molded to the side walls 12 and 14 to define the magazine portion 22. It is seen that the sets of pins 28 and 32 are also located in staggered vertical relation and correspond to the location of the pins 24 and 26 so that the magazine portions 18, 20 and 22 all have a generally zig-zag configuration that define circuitous pathways for the articles deposited therein. Located at the lower end of the zig-zag magazine portion 18 and in communication therewith is a dispensing station generally indicated at 34 that is defined by parallel tracks 36 and 38 that are molded to the side walls 12 and 14 respectively. It is seen that the tracks 36 and 38 are somewhat inclined so as to receive and direct the articles to be dispensed to a dispensing position located at the lower forward-most end of the rack. In this connection the lower forwardmost portion of the walls 12 and 14 are cut out as indicated at 40 and 42 to define grooves, the grooves terminating at the forwardmost end thereof in upstanding projections 44 and 46 respectively. Fixed to the projections 44 and 46 are stop pins 48 and 50 that cooperate with the cut-out portions 40 and 42 to locate the lowermost article at the dispensing station in a dispensing position.

As shown more clearly in FIG. 1, articles such as batteries indicated at 52 that are to be dispensed from the rack are loaded into the magazine portion 18 by being dropped therein from the top of the rack. The batteries 52 descend through the circuitous pathway in the magazine portion 18 as defined by the sets of pins 24 and 26 to the dispensing station 34 located at the lower end of the rack. The batteries roll onto the trackways 36 and 38 at the dispensing station 34 to the dispensing position, the lowermost battery 52 coming to rest on the stops 48 and 50 and being accessible for dispensing through the cut-out portions 40 and 42 formed in the side walls 12 and 14. The remaining batteries 52 stack upwardly from the lowermost one until the magazine portion 18 is filled.

Since the articles to be dispensed from the rack 10 are normally batteries, some provision must be made within each magazine portion to compensate for the axially extending terminal that is formed on each battery. As shown in FIG. 3, each battery 52 is formed with a terminal 54 and thus it is seen that the generally cylindrical body portion of each battery 52 has an axial dimension that is somewhat less than the space that is formed between the side walls 12 and 14. However, the spacing of the side walls 12 and 14 is necessary in order to accommodate the projecting terminal 54 of each battery 52. In order to prevent the batteries 52 from tilting within the magazine portion 18 as they descend therethrough, spacer strips 56 and 58 are joined to the side walls 12 and 14 respectively and act to confine the cylindrical body portion of each battery 52 therebetween. As shown in FIG. 3, the spacer strips 56 and 58 are disposed such that they are located rearwardly of the terminals 54 regardless of the manner in which the batteries are placed in the magazine portion and therefor will not interfere with the terminal 54 of each battery as the batteries descend in the magazine portion 18. It is seen that the spacer strips 56 and 58 insure that the batteries 52 are properly received within the magazine portion 18 as they descend to the dispensing station 34, the batteries 52 being directed thereto in a circuitous path by the spaced pins 24 and 26. Thus the spacer strips 56 and 58 confine the batteries therebetween with respect to the longitudinal axis thereof and permit batteries to descend through the magazine portion 18 without undue tilting which could cause jamming of the magazine portion.

The magazine portions 20 and 22 are formed similarly to the magazine portion 18 and as shown in FIG. 1, the magazine portion 20 terminates at the lower end thereof in a dispensing station as defined by tracks 60 and 62 that are joined to the side walls 12 and 14 respectively. The side walls 12 and 14 are also cut out to define concave portions 64 and 66, which in turn terminate at the forwardmost end of the tracks 60, 62 in upstanding projections 68 and 70. Stop pins 72 and 74 are fixed to the upstanding projections 68 and 70 respectively of the side walls and define stops for locating batteries indicated at 76 at the dispensing station that communicates with the magazine portion 20. It will be observed in FIGS. 1 and 3 that the batteries 76 that are received in the magazine portion 20 are somewhat reduced in size with respect to the batteries 52 and thus the spacing between the sets of pins 26 and 28 with respect to each other is somewhat reduced with respect to the spacing illustrated between the sets of pins 24 and 26. It is understood that the staggered vertical spacing of the pins 26 and 28 direct the batteries 76 through the magazine portion 20 in a circuitous pathway to the dispensing station defined by the tracks 60 and 62. As previously described in connection with the magazine portion 18, spacer strips are also provided in the magazine portion 20 and are joined to the side walls 12 and 14 for reducing the space between the side walls 12 and 14 to accommodate terminals formed on the batteries 76. As shown in FIG. 3, strips 78 and 80 are joined to the side walls 12 and 14 respectively and since the length of the batteries 76 is somewhat reduced with respect to the batteries 52, the strips 78 and 80 are slightly wider than the strips 56 and 58 and project into the magazine portion 18. The spacer strips 78 and 80 thus accommodate the batteries 76 therebetween so that they may descend through the magazine portion 20 into the dispensing station without tilting and jamming of the magazine portion 20.

The magazine portion 22 is adapted to accommodate batteries indicated at 82 that are also reduced in size with respect to the batteries 76. In order to accommodate the batteries 82 between the sets of pins 28 and 32 the space therebetween is located accordingly but the pins in each set is vertically spaced so as to form the zig-zag or circuitous pathway for the batteries 82 as they descend through the magazine portion 22 to a dispensing station located therebelow. Tracks 84 and 86 joined to the side walls 12 and 14 communicate with the magazine portion 22 and define a dispensing station for the batteries 82 contained thereon. The tracks 84 and 86 direct the batteries 82 to the forward end of the dispensing station at which upstanding projections 88 and 90 are located. Stop pins 92 and 94 are joined to the upstanding projections 88 and 90 and form the forwardmost end of this dispensing station. The forwardmost edges of the side walls 12 and 14 are also cut out as similarly described to enable the forwardmost battery 82 to be easily withdrawn from its dispensing station.

Spacer strips 96 and 98 are joined to the side walls 12 and 14 respectively and reduce the space therebetween for accommodating the terminals formed on the batteries 82. The width of the spacer strips 96, 98 is sufficient to receive the body portion of the batteries 82 therebetween so that the batteries 82 may descend downwardly through the magazine portion to the tracks 84 and 86 without tilting or jamming of the magazine portion 22.

It is seen that the batteries 52, 76 and 82 are loaded into their respective magazine portions at the upper end of the rack 10 and descend by gravity through the zig-zag pathways to their dispensing stations. Removal of the batteries from the dispensing stations is accomplished simply by lifting each battery as required, the stack from which a battery is lifted moving downwardly by gravity to present the next lowermost battery in the dispensing position. The rack 10 is easily assembled since each of the side walls 12 and 14 and the pins and spacer strips joined thereto are molded in a unitary construction. When the spacer members 16 are joined together as indicated in FIGS. 2 and 3 to assemble the rack the side walls 12 and 14 are properly spaced and are adapted to receive the batteries therein. The spacer members parts are normally joined together by heat sealing and the walls are preferably of clear plastic so as to provide visual access into the interior of the magazine portions and dispensing stations.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In an article dispensing rack, side walls located in spaced-apart, parallel relation, means interconnected to said side walls for locating them in their spaced-apart relation, an article receiving magazine portion defined by said side walls and located between said magazine portion including a plurality of article directing elements that are joined to said side walls for directing articles introduced into said magazine at the upper end downwardly therethrough to a dispensing station, said article directing elements being defined by horizontally extending cylindrical pins, each of which is joined to the inner surface of a side wall and is disposed in aligned, axial relation to a corresponding pin located on the inner surface of the opposite side wall, said pins being generally circular in cross section and having a longitudinal dimension somewhat less than the space between said side walls to define a central space therebetween, the pins on each side wall being arranged in staggered vertical relation and cooperating with the opposed pins on the opposite side wall to define a circuitous pathway for said articles as they move downwardly through the magazine portion to said dispensing station.

2. In an article dispensing rack as set forth in claim 1, spacer members being joined to said side walls for reducing the space in said magazine between said walls so as to accommodate articles in said magazine portion, wherein the longitudinal dimension of said articles generally corresponds to the dimension of the reduced space in said magazine portion but is such as to permit movement of the articles through the magazine portion.

3. In an article dispensing rack as set forth in claim 2, the articles that are dispensed having a cylindrical body portion with an outer extending central projection formed on at least one end thereof and that extends beyond the body portion, said spacer members just accommodating the body portion of said articles therebetween and being located relative to said article directing elements so that the central projections of said articles are accommodated in said magazine.

4. In an article dispensing rack as set forth in claim 3, said dispensing station including tracks that are joined to said sidewalls and are disposed in spaced relation with respect to each other, said spaced tracks receiving said articles thereon as they descend through said magazine portion, and stop members joined to said side walls adjacent to the lowermost ends of said tracks and defining the endmost portion of said dispensing station at which said articles are removed.

5. In an article dispensing rack as set forth in claim 3, at least one other magazine portion and associated dispensing station formed between said side walls, said other magazine portion being defined by a second set of cylindrical pins that are joined to said side walls and that are arranged in staggered vertical relation to define a circuitous pathway, said second set of pins being forwardly spaced with respect to the first named pins so that the circuituous pathway defined thereby is disposed in parallel relation with respect to the pathway defined by the first named pins.

6. In an article dispensing station as set forth in claim 5, one of the circuituous pathways that defines a magazine portion being longer vertically than the other, so that the dispensing station for each pathway is disposed at the forwardmost end of said rack with respect to the manner of use thereof.

References Cited

UNITED STATES PATENTS 3,194,620 7/1965 Sauer _____ 312—45
3,298,763 1/1967 Di Domenico _____ 312—45
3,306,688 2/1967 Di Domenico.
3,221,930 12/1965 Nasgowitz _____ 221—311 XR BOBBY R. GAY, Primary Examiner.

J. L. KOHNEN, Assistant Examiner.